United States Patent [19]

Maruyama

[11] 4,102,048
[45] Jul. 25, 1978

[54] DEVICE FOR CORRECTING POSITIONAL DEVIATION AND REDUCED SCALE OF PHOTOGRAPH

[75] Inventor: Takashi Maruyama, Kawasaki, Japan

[73] Assignee: Nippon Kogaku K.K., Tokyo, Japan

[21] Appl. No.: 662,090

[22] Filed: Feb. 27, 1976

Related U.S. Application Data

[63] Continuation-in-part of Ser. No. 578,082, May 16, 1975, abandoned.

[51] Int. Cl.² .............................................. G06G 7/00
[52] U.S. Cl. ...................................................... 33/1 A
[58] Field of Search ........... 33/20 D, 1 A, 1 R, 23 R, 33/23 G, 23 D, 25 R, 25 C; 353/5, 6

[56] References Cited

U.S. PATENT DOCUMENTS

| 1,471,869 | 10/1923 | Turner | 33/25 R |
|---|---|---|---|
| 1,943,205 | 1/1934 | Coradi | 33/25 R |
| 2,300,326 | 10/1942 | Wesleysmith | 33/20 D |
| 2,729,892 | 1/1956 | Grueltner | 33/25 R |
| 3,465,444 | 9/1969 | Blachut et al. | 33/1 A |
| 3,614,410 | 10/1971 | Bailey | 33/1 A |

*Primary Examiner*—Richard E. Aegerter
*Assistant Examiner*—John W. Shepperd
*Attorney, Agent, or Firm*—Shapiro and Shapiro

[57] ABSTRACT

In a device for correcting, with respect to the reference plane of an object having a group of contour lines thereon, the positional deviation and variation in the reduced scale created corresponding to the height of each contour line when the object is photographed through a photographic objective, there is provided means for tracing each of the contour lines photographed on the film and generating a position signal for each of the contour lines. A correction mechanism is rotatably supported at a point ($\overline{N}$), and has introduced thereinto the ratio between the distance (H) from the center of the photographic objective to the reference plane of the object and the distance ($\Delta H$) from any of the contour lines being traced by the signal generating means to the reference plane. The correction mechanism receives at the input side thereof the position signal from the signal generating means to generate a position signal (P′) which satisfies the relation that $P' = (1 - (\Delta H/H))P$, where P is the input signal from the signal generating means. The signal generating means and the correction mechanism are associated together so that the correction mechanism satisfies the relation that $P = P' = 0$ when the signal generating means traces the principal point of the film. Means is provided for detecting and indicating the position signal (P′) from the correction mechanism.

6 Claims, 12 Drawing Figures

FIG. 1
FIG. 2
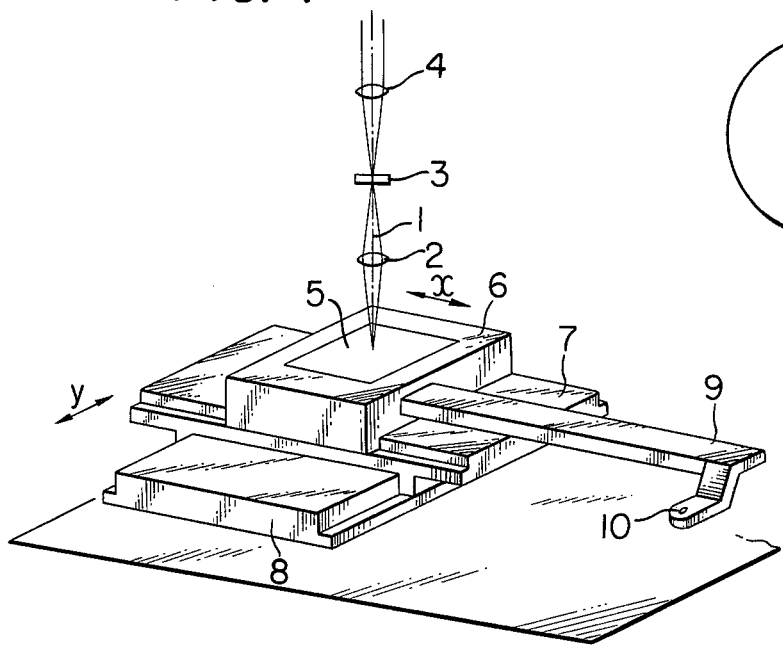
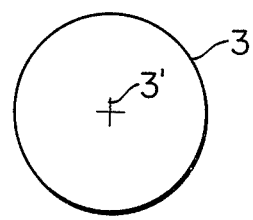
FIG. 3
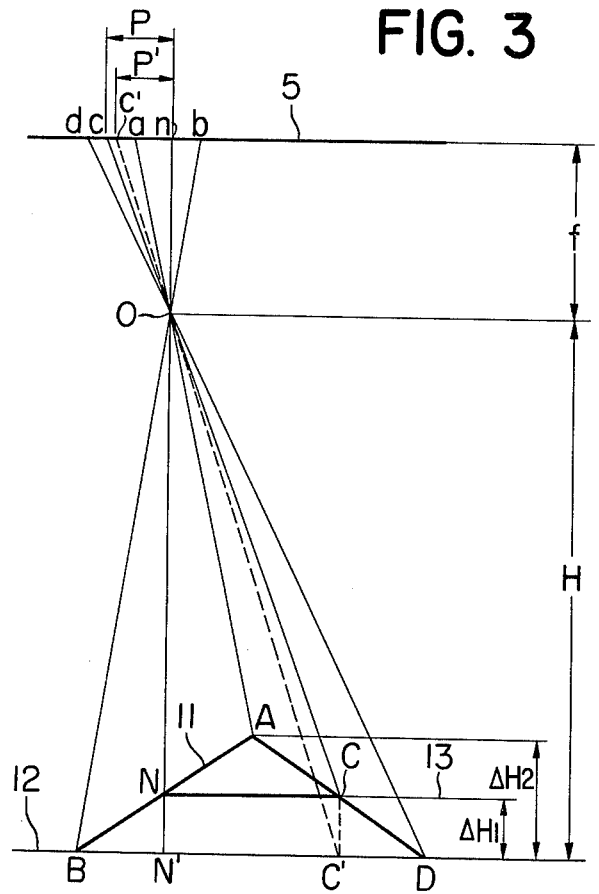

DEVICE FOR CORRECTING POSITIONAL DEVIATION AND REDUCED SCALE OF PHOTOGRAPH

This application is a continuation in part of copending application Ser. No. 578,082 filed May 16, 1975 now abandon.

BACKGROUND OF THE INVENTION

1. Field of the Invention

This invention relates to a device for correcting positional deviation and variation in reduced scale produced when an object having contour lines, for example, moiré stripes created thereon is photographed on film, and for representing the contour lines on the film in the form of either exact contour drawing or polar coordinates.

2. Description of the Prior Art

There is a method of creating contour lines or moiré stripes on the surface of a body to thereby examine the configuration of the body by measuring the coordinates or by depicting contour lines. Means for creating moire stripes on an object is well-known and need not particularly be described herein. When contour lines or moir. stripes have been created, the distance between adjacent lines or stripes in the direction of depth (the direction of photography) may be regarded as known. For example, in FIG. 3 of the accompanying drawings, if $\overline{BD}$ and $\overline{NC}$ are considered to be moiré stripes, $\Delta H1$ is known. When these are photographed by the use of a camera having a focal length $f$, there will occur inconveniences as will hereinafter be described.

First, as is clearly shown in FIG. 4, contour line $\overline{NC}$ is photographed on film 5 with a positional deviation with respect to contour line $\overline{BD}$, and vertex A is also deviated.

Further, it is seen from FIG. 3 that the reduced scale of contour line $\overline{BD}$ on the film is $f/H$, that of contour line $\overline{NC}$ is $f/(H - \Delta H1)$, and that of the region near the vertex A is $f/(H - \Delta H2)$. Thus, when the exposed film is used to carry out an analysis, it will be necessary to correct the positional deviation and reduced scale for the information on the film 5. However, as regards, for example, $\overline{N'C'}$ which is an orthogonal projection of contour line $\overline{NC}$ on a reference plane 12 (the plane on which contour line $\overline{BD}$ exists), points $n$ and $c'$ at which the point N' and C' are imaged on the film 5 are on the same reduced scale and in proper positional relationship with points $b$ and $d$ at which the points B and D on the reference plane 12 are imaged on the film. If it is assumed that the film surface 5 and the reference plane 12 are parallel and that N' On is the optical axis, the point $n$ is called the principal point (which is in accord with the vertical point). It is also clear from the drawing that points N and N' are imaged at point $n$ in overlapping relationship. Designated by 0 is the center of the photographic objective.

On the film 5, the relation between P and P' will now be considered on the assumption that $\overline{nc}=P$ and $\overline{nc'}=P'$.

$$\Delta noc \sim NOC \therefore P/f = \frac{\overline{NC}}{H - \Delta H1}$$

$$\Delta noc' \sim NOC' \therefore P'/f = \frac{\overline{N'C'}}{H}$$

Also, since NC=N'C', $$P' = (1 - \frac{\Delta H1}{H})P \quad (1)$$

where $\Delta H1$ is known as previously mentioned, P is known (measurable) distance from the point photographed on the film to the principal point $n$, and H can be known as the photographic reference plane (even if it is unknown, it can easily be known by making some contrivances in the stage of photography). Thus, a proper amount of correction may be obtained from equation (1).

SUMMARY OF THE INVENTION

The present invention intends to provide a device using a correction mechanism which will satisfy equation (1) to thereby correct contour lines (such as moiré stripes) on a film including errors and represent such contour lines in the form of either accurate contour drawing or polar coordinates.

The invention will become more fully apparent from the following detailed description of some embodiments thereof taken in conjunction with the accompanying drawings.

BRIEF DESCRIPTION OF THE DRAWINGS

FIG. 1 shows the viewing device forming part of the present invention.

FIG. 2 shows a form of the reference mark formed on the focusing lens used in the viewing device.

FIG. 3 illustrates the principle of the positional deviation and reduced scale occurring when an object is photographed on a film.

DESCRIPTION OF THE PREFERRED EMBODIMENTS

Figure 4:
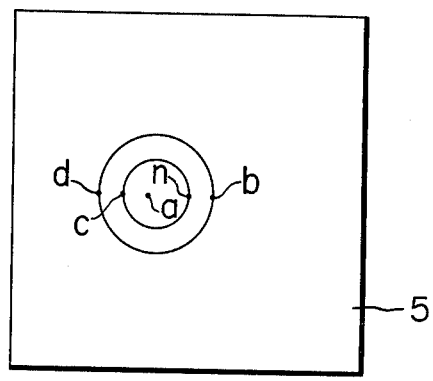
FIG. 4 shows an example of the film on which contour lines are photographed.

Referring to FIG. 1, there is shown the viewing device for viewing therethrough a film with contour lines photographed thereon. In the figure, numeral 1 designates the optical axis of a viewing optical system and numeral 2 denotes an objective lens. The image on film 5 may be focused on a focusing lens 3 by the objective lens 2. On the optical axis of the focusing lens 3, there is formed a measurement reference mark 3' (shown in FIG. 2) which serves as the reference when contour lines on the film 5 are traced. Numeral 4 designates a relay lens for directing the focused image on the focusing lens to an eyepiece. The viewing optical system is secured to the viewing device. The film 5 may be set on a mount bed 6 (the mechanism for setting the film is not shown). The mount bed 6 is slidable in X-direction with respect to a mount bed 7, which in turn is slidable in Y-direction with respect to a mount bed 8. The above-described members constitute a photograph holding means in the viewing device. Thus, the film 5 is free to move in X- and Y-direction. When the principal point and the measurement reference mark 3' are aligned, it will of course be possible to read the x-coordinates of any desired point on the film with the principal point as origin if an index and a scale (which may obviously be replaced by photoelectric measuring means) are provided between the mount beds 6 and 7 and zero setting is done. Also, if an index and a scale are provided between the mount beds 7 and 8 and the position in which the principal point on the film and the measurement reference mark 3' of the viewing optical system are aligned is determined as zero setting, it will be possible to know the y-coordinates of any desired point on the film.

Numeral 9 designates an arm fixed to the mount bed 6 and having an aperture 10 formed in the free end thereof. The aperture 10 is connected to the input side of a correction mechanism which will hereinafter be described. The arm 9 and aperture 10 constitute transmission means enabling a contour line in the photograph to be traced, as described below, for generating a displacement P, where P is the distance of a point on the traced contour line from the principal point on the photograph. Such displacement is a mechanical input signal to the correction mechanism which is responsive thereto for generating a displacement P' satisfying equation (1). Thus, the displacement P' is a mechanical output signal with which the traced contour can be mapped into its projection onto the reference plane. Measurements made on the projected contour line yield the surface coordinates of the body at the traced contour.

The correction mechanism forming part of the correction device of the present invention will now be described.

Figure 5A:
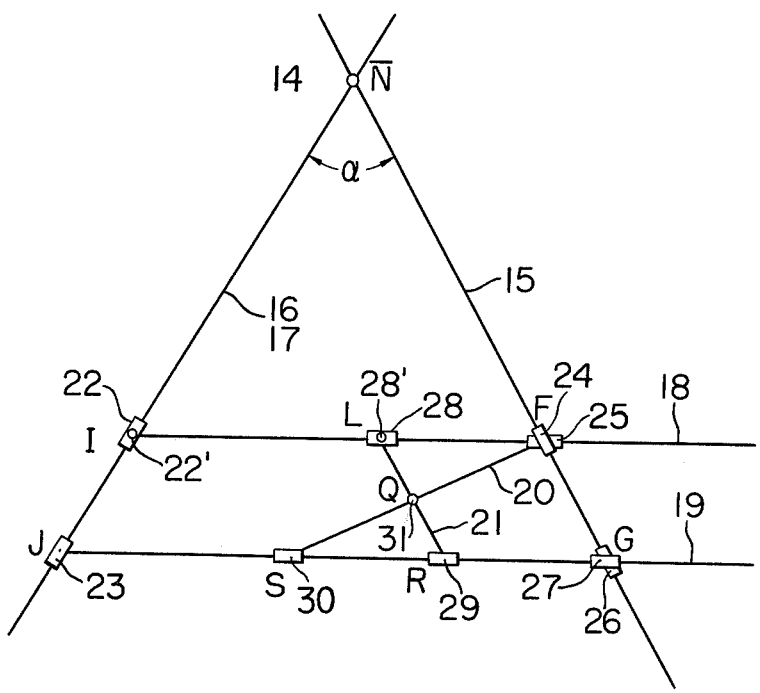
FIG. 5(a) is a top plan view of a first embodiment of a correction mechanism forming a part of the present invention.
Figure 5B:
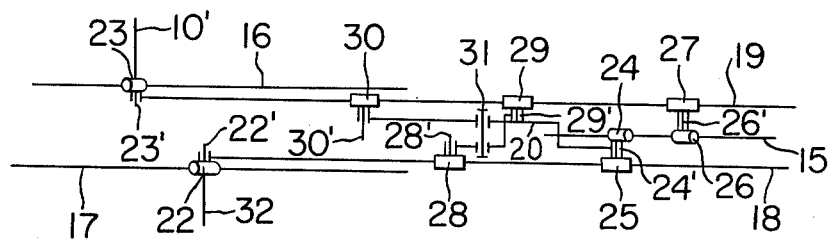
FIG. 5(b) is a side elevational view of the correction mechanism of FIG. 5(a).

FIGS. 5(a) and 5(b) schematically show a first embodiment of the correction mechanism which satisfies the equation (1) shown previously. In this figure, numeral 14 is a rotary shaft which makes intersecting guide bars 15, 16 and 17 rotatable, the angles formed respectively between the guide bars 15 and 16 and 17 being each fixed as a constant angle α. Guide bar 15 constitutes first guide bar means and guide bars 16 and 17 constitute second guide bar means. It will be apparent that the guide bars 16 and 17 which are parallel may be replaced by a single bar. Sliders 24 and 26 are slidable on the guide bar 15 and may be fixed by clamps (not shown). Sliders 22 and 23 are slidable on the guide bars 17 and 16, respectively. A guide bar 18 is supported at one end for rotation about the shaft 22' of the slider 22 and passes through a slider 25 mounted for rotation about a shaft 24' extending from the slider 24. Likewiser, a guide bar 19 is supported at one end for rotation about the shaft 23' of the slider 23 and passes through a slider 27 mounted for rotation about a shaft 26' extending from a slider 26. A sizing bar 20 is mounted for rotation about a shaft 31 and also for rotation about the shaft 24' and a shaft 30' on a slider 30 on the guide bar 19. A sizing bar 21 is mounted for rotation about the shaft 31 and also for rotation about a shaft 28' on a slider 28 on the guide bar 18 and about a shaft 29' on a slider 29 on the guide bar 19. It should be understood that there is no eccentric relationship between these guide bars, sizing bars, sliders and rotary shafts. The geometric points of intersection between the various shafts and bars are defined as shown in FIG. 5(a).

If, in the sizing bars 20 and 21, the following relations are defined $$\overline{LQ} = \overline{RQ} \text{ and } \overline{SQ} = \overline{FQ},$$

then the guide bars 18 and 19 may be maintained parallel irrespective of point J. thus forming parallel guide bars. Hence, $$\frac{\overline{NI}}{\overline{NJ}} = \frac{\overline{NF}}{\overline{NG}}$$

Consequently, if, for example, setting is made so as to provide the following relation (by the use of a scale and clamp mechanism)

$$\frac{\overline{FG}}{\overline{NG}} = \frac{\Delta H1}{H},$$

then $$\frac{\overline{NF}}{\overline{NG}} = (1 - \frac{\Delta H1}{H}) = \frac{P'}{P} = \frac{\overline{NI}}{\overline{NJ}}$$

Consequently, it will be found that the equation (1) mentioned above is satisfied by this mechanism. Therefore, if $\overline{N}$ is considered a point corresponding to the principal point on the film, $\overline{NI}$ is equivalent to P' when $\overline{NJ}$=P. When this is considered with respect to point C in FIG. 3 for clarity, points $\overline{N}$, I and J correspond to points n, C' and C, respectively. Description will now be made of operation of the correction device of the present invention using the first embodiment of the correction mechanism shown in FIGS. 5(a) and 5(b).

Figure 5C:
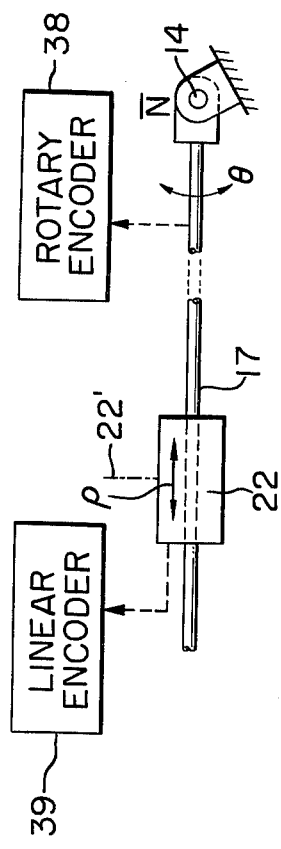
FIG. 5(c) shows the viewing device of FIG. 1 coupled to the correction mechanism of FIGS. 5(a) and 5(b).

First, a contour line is created in an object (a body to be measured) and it is photographed. Analysis cannot immediately be effected because the film with the contour line photographed thereon also contains information including some errors, as previously described. Therefore, as shown in FIG. 5(c), the shaft 10' on the slider 23 in the correction mechanism of the present invention (namely, the input side of the correction mechanism) is inserted in the aperture 10 formed at one end of the arm 9 extending from the mount bed 6, and a pencil 32 is provided in the core on the slider 22. The film is then set on the mount plate 6 of the viewing mechanism, and the reference plane is sought after. When the reference plane (the contour line BD) has been found out on the film, the slider 24 of the correction mechanism is brought into coincidence with the slider 26 to bring about the relation that $\overline{FG}=O$, since $\Delta H1=O$ in the reference plane. A mechanism which will satisfy this is easy to realize. Said contour line is traced by the reference mark 3' to depict a reference contour line. Next, in order to depict the contour line on the film corresponding to NC in FIG. 3, point F in the correction mechanism is made to satisfy the relation that $$\frac{\overline{FG}}{\overline{NG}} = \frac{\Delta H1}{H},$$

and the sliders 24 and 26 are clamped in such conditions. If the contour line on the film 5 which lies at the height $\Delta H1$ from said reference contour line is traced by the reference mark 3', the pencil 32 will depict a contour line properly corrected with respect to the reference contour line.

The same procedure is carried out with respect to $\Delta H2$, $\Delta H3$ and so forth. That is, if the principal point $n$ on the film is made to exactly correspond to the point $\overline{N}$ in the correction mechanism of FIG. 5 which is equivalent to the principal point, the error resulting from the aforesaid positional deviation and difference in reduced scale may be corrected with the contour line on the reference plane 12 as the reference. More specifically, the correction in the direction toward the origin is accomplished by the sliders 22 and 23 sliding in the direction toward $\overline{N}$, and the correction in the rotational direction with respect to the principal point is accomplished by the guide bars 16 and 17 rotating with the guide bar 15 about $\overline{N}$. Naturally, the sliders 22 and 23 may sometimes move beyond the point $\overline{N}$ and this is possible from the mechanism. When it is desired to obtain a correction drawing of great magnification, it may be achieved by locating the points F and I at the opposite side of the point $\overline{N}$ with respect to the points J and G. More particularly, if the point F is set so as to satisfy the relation that $\overline{NF} = 2(H - \Delta H1)$ (of course, in this case, a mechanism for maintaining the parallel guide bars 18 and 19 parallel is provided), the movement of the point I will depict a drawing twice as large as that described above. Another possible method is to take out the movement of the mount bed 6 with respect the origin in a multiplied form and correspondingly enlarge the correction mechanism of FIGS. 5(a) and 5(b) to provide a magnified representation.

Figure 6:
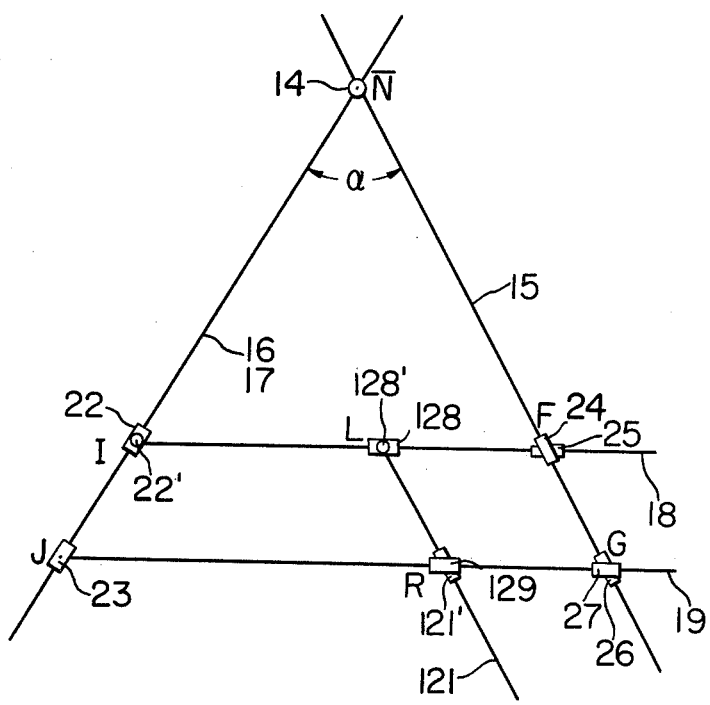
FIG. 6 schematically shows a second embodiment of the correction mechanism.

FIG. 6 shows a second embodiment of the correction mechanism. In FIG. 6, guide bar 121 is supported for rotation about the shaft 128' of slider 128 fixed on guide bar 18, and passes through slider 121' in parallelism to guide bar 15. The slider 121' is fixed to a shaft (not shown) of slider 129 and provided with a clamp mechanism (not shown). The slider 121' is positioned so as to satisfy the condition that $FG=LR$. Under such condition, guide bars 18 and 19 are parallel to each other. It will be apparent that the length of the guide bar 121 is sufficient to satisfy the condition that $FG=LR$.

In any of the above-described embodiments, the pencil 32 provided in the output side (point I) of the correction mechanism depicts the movement of the point I in the form of a contour line. Alternatively, the mechanical output of the correction mechanism can be used to generate electrical signals representative of the polar coordinates of the point I as it develops a projected contour from the traced contour. In such case, the electrical signals can be used to drive a mechanized plotter (not shown) that would produce the projected contour.

Figure 5D:
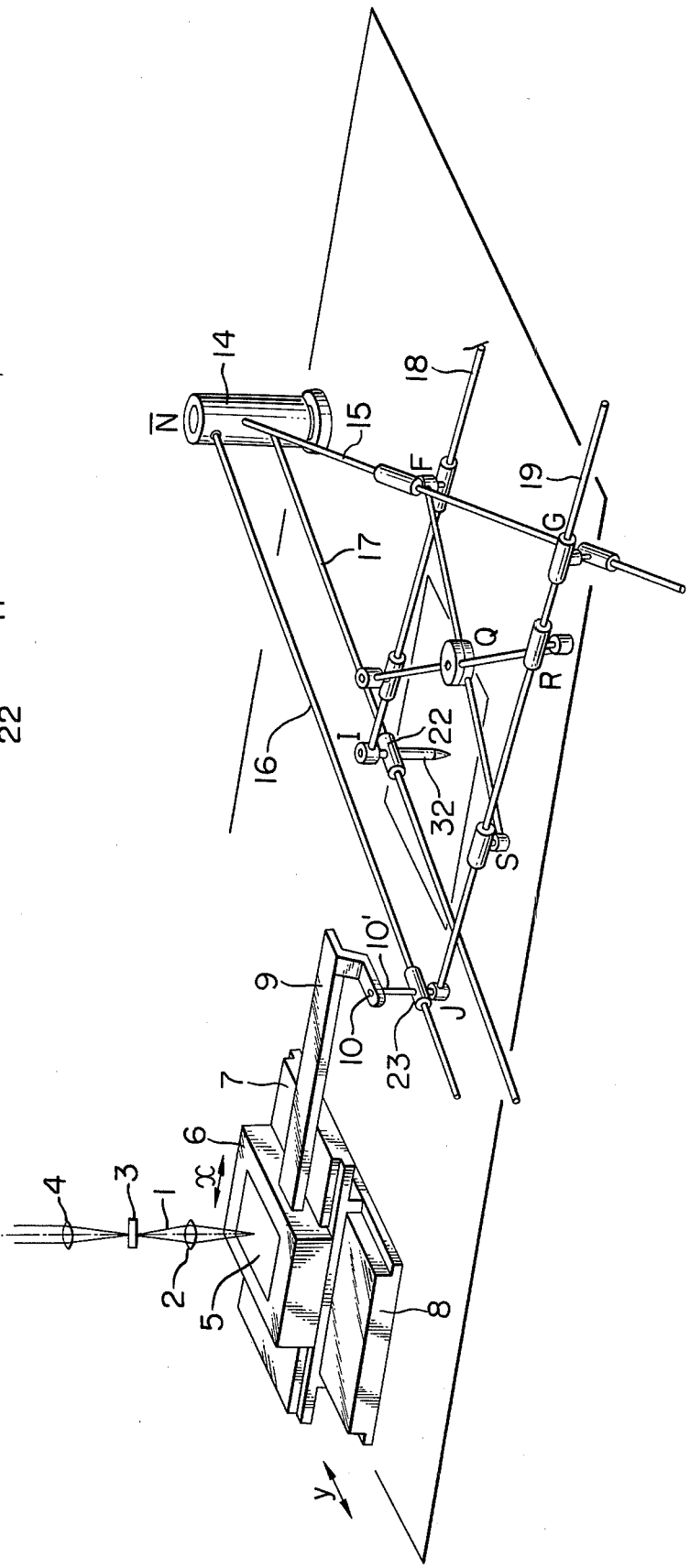
FIG. 5(d) illustrates, in block diagram form, a linear encoder and a rotary encoder for representing the output signal of the correction mechanism in polar coordinates.

This alternative arrangement is shown in FIG. 5(d) wherein rotary encoder 38 is activated by angular movement $\theta$ of shaft 14 (i.e., movement of bar 17 about $\overline{N}$) to provide the polar angle of a projected point corresponding to a traced point, and linear encoder 39 is actuated by sliding movement of slider 22 on bar 17 to provide the polar displacement $\rho$ of a traced point from the principal point.

A third embodiment of the correction mechanism will now be described with reference to FIGS. 7 and 8. Parallel guide bars 103 and 104 intersect the axis of rotation 114 of a bed 120 and are fixedly supported on the bed. A slider 105 is slidable on the guide bar 103. A shaft 106 is secured to the slider 105 and in connected to the aperture 10 shown in FIG. 1. A slider 107 is slidable on a guide bar 108, which intersects guide bars 103 and 104 and is supported for rotation about the axis of a shaft 110 mounted on the bed. Slider 107 is rotatably supported on a shaft 105' extending from slider 105. Thus, when slider 105 is moved on guide bar 103, slider 107 is moved thereby on guide bar 108 so that slider 107 is rotated on shaft 105' as guide bar 108 is rotated about shaft 110. A slider 109 is aildable on guide bar 108. A slider 112 is rotatably supported on a shaft 109' extending from slider 109 and is slidable on a guide bar 111 secured to a slider 113 which is slidable on guide bar 104, guide bar 111 being mounted on the slider 113 so as to be perpendicular to guide bar 104. A describing device 115 such as a pencil is provided in the core on the slider 112. Because shaft 110 on which guide bar 108 is rotatably supported is mounted on the bed, it will be apparent that the entire correction mechanism is supported for rotation about the axis of rotation 114 of the bed. The line $\overline{NG}$ between axes 110 and 114 is perpendicular to shafts 103 and 104, so that it is always parallel to line $\overline{IF}$ connecting the points of intersection of guide bar 111 with guide bars 104 and 108.

Because guide bar 111 and the line $\overline{NG}$ are parallel at all times, if the point of intersection of guide bars 103 and 108 is represented by J, it will be apparent that $$\frac{\overline{JI}}{\overline{JN}} = \frac{\overline{IF}}{\overline{NG}}$$

Figure 7:
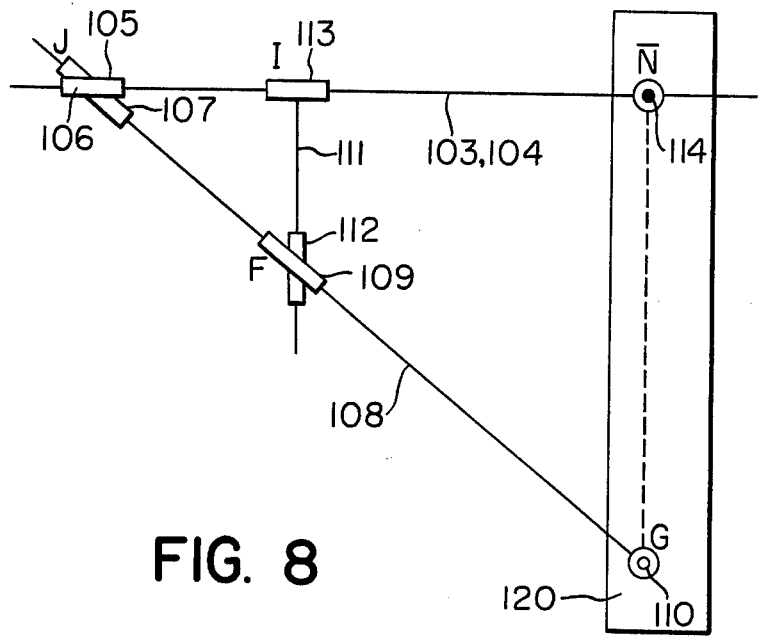
FIG. 7 is a top plan view of a third embodiment of the correction mechanism.
Figure 8:
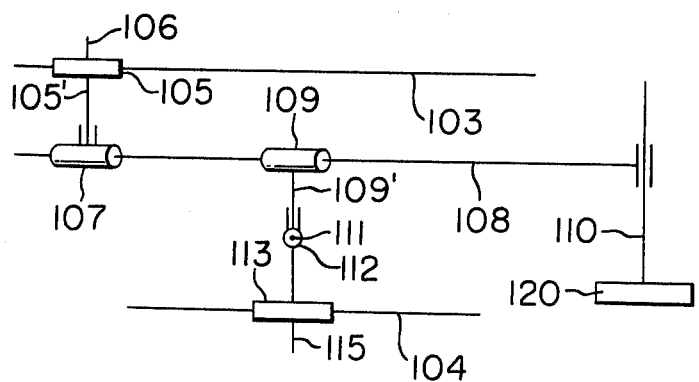
FIG. 8 is a side elevational view of the embodiment of FIG. 7.

Thus, the various points N, G, F, J and I in the mechanism of FIG. 7 may be set so that $$\frac{\overline{IF}}{\overline{NG}} = \frac{\Delta H}{H}, \text{ and}$$

$$\frac{\overline{NI}}{\overline{NG}} = \frac{P}{P}$$

It will therefore be apparent that the correction mechanism of this embodiment can perform the same correction function as the mechanisms shown in FIGS. 5(a), 5(b) and 6.

Figure 9:
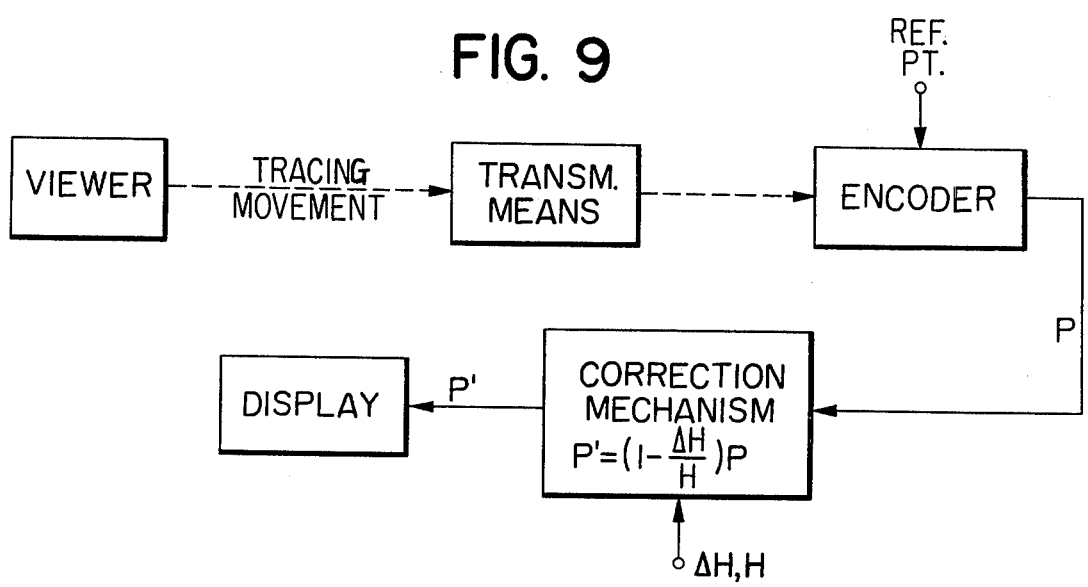
FIG. 9 is a block diagram showing the generic form of the other embodiments of the correction mechanism, and illustrating its coupling to a viewing device and transmission means.

Also, it will be apparent that, instead of using the viewing device as shown in FIG. 1, the contour line on the film may be directly traced and the movement of such tracing may be introduced into the input side (point J) of the correction mechanism. In its most general form, the correction mechanism has a transfer function in the form of equation (1) operating on an input P to produce an output P'. This is illustrated in FIG. 9 which shows an electrical equivalent of the mechanical systems previously described. As a contour on a photograph is tracked using the viewer 200, which is similar to that shown in FIG. 1, the resultant physical displacement is transferred to the transmission means 202, which is similar to components 9, 10 in FIG. 1. The mechanical output of the transmission means is applied to an encoder 204 which is entirely conventional and converts the displacement of means 202 into electrical signals P, digital or analog, that represent the coordinates of a traced point on a contour line relative to the principal point. The electrical signals are applied to computer 206 havng equation (1) as its transfer function. The output P' of computer 206 is a set of electrical signals from which the projection of the traced contour can be displayed or plotted on a conventional plotter.

I claim:

1. A device for correcting, with respect to the reference plane of an object having a group of contour lines thereon, the positional deviation and variation on a reduced scale created corresponding to the height of each contour line when the object is photographed on film through a photographic objective, the device comprising:

tracing means for tracing and generating a displacement along each of the contour lines photographed on the film;

a shaft provided on a point $(\overline{N})$;

a correction mechanism including first guide bar means rotatably supported on the shaft, second guide bar means rotatably supported on the shaft, the first and the second guide bar means intersecting at the point N on the shaft with a predetermined angle ($\alpha$), two parallel bars slidably mounted on and intersecting each of the first and the second guide bar means, means for maintaining the parallel bars parallel to each other, means for setting said parallel bars to said first guide bar means so that each distance $(\overline{NF})$ and $(\overline{NG})$ from the intersecting point $(\overline{N})$ of the first and the second guide bar means to the intersecting points (F, G) between said first guide bar means and said two parallel bars, may satisfy the relationship $$\frac{\overline{NF}}{\overline{NG}} = \frac{H - \Delta H}{H}$$

where H is the distance from the center of the photographic objective to the reference plane of the object, and $\Delta H$ is a distance from a contour line being traced by the tracing means to said reference plane, said correction mechanism being connected to said tracing means at a point (J) where one of said two parallel bars which intersects said first guide bar means at the point (G) intersects said second guide bar means so that when said tracing means traces a principal point on the film the relation $\overline{NF} = \overline{NG}$ may be attained; and an indicating means for indicating a locus provided at a point (I) of intersection between the other one of said two parallel bars and said second guide bar means.

2. A device according to claim 1, wherein the tracing means comprises film mounting means for free movement in a plane; an optical system for viewing the film including a focusing lens having a reference mark formed on optical axis thereof; and members for transmitting the movement of the film mounting means to the correction mechanism, whereby one can move the mounting means so that a contour line is in coincidence with the reference mark while looking into said viewing optical system, and thereby the transmission members transmit the movement of the mounting means to the correction mechanism.

3. A device according to claim 1, wherein said indicating means comprises means for detecting the angle of rotation of the point (I) about said point $(\overline{N})$, means for detecting the amount of deviation of the point (I) from said point $(\overline{N})$, and means for indicating the corrected positions of said contour lines in the form of polar coordinates.

4. A device according to claim 1, wherein said indicating means comprises means provided at the point 1 of said correction mechanism for representing the corrected positions of said contour lines in the form of lines.

5. A device according to claim 1, wherein said second guide bar means comprises two parallel guide bars which intersect said two parallel bars, respectively.

6. A device for correcting, with respect to the reference plane of an object having a group of contour lines thereon, the positional deviation and variation on a reduced scale created corresponding to the height of each contour line when the object is photographed on film through a photographic objective, the device comprising:

tracing means for tracing and generating a displacement along each of the contour lines photographed on the film;

a shaft provided on a point $(\overline{N})$;

a correction mechanism including a mount bed connected for rotation with the shaft, a first guide bar secured to the mount bed so as to intersect the shaft, a rotary shaft secured to the mount bed at a point (G), a second guide bar mounted for rotation with said rotary shaft and slidably connected to said first guide bar, a third guide bar connected to and intersecting said first and second guide bars at respective points (I) and (F) so as to be parallel to a straight line $(\overline{NG})$ passing through the point where the rotary shaft is secured to said mount bed, said third guide bar being movable on said first and second guide bars, means for maintaining the third guide bar parallel to the straight line, and means for setting said correction mechanism so that a distance $(\overline{IF})$ between the intersecting point (I) of said first and third guide bars and intersecting point (F) of said second and third guide bars satisfy the relationship $$\frac{\overline{NG}}{\overline{IF}} = \frac{H}{\Delta H}$$

where H is the distance from the center of the photographic objective to the reference plane of the object, and $\Delta H$ is a distance from a contour line being traced by the tracing means to the reference plane, said correction mechanism being connected to said tracing means at the point (J) where said second guide bar intersects said first guide bar so that when said tracing means traces a principal point of the film the relation $\overline{NG} = \overline{IF}$ may be attained; and an indicating means provided at the point (I) where the third guide bar intersects the first guide bar.

* * * * *